(12) United States Patent
Avkarogullari et al.

(10) Patent No.: US 9,129,396 B2
(45) Date of Patent: *Sep. 8, 2015

(54) DISPLAY DRIVING ARCHITECTURES

(71) Applicant: Apple Inc., Cupertino, CA (US)

(72) Inventors: Gokhan Avkarogullari, Cupertino, CA (US); John Harper, San Francisco, CA (US); Joshua H. Shaffer, San Jose, CA (US); Roberto G. Yepez, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/601,070

(22) Filed: Jan. 20, 2015

(65) Prior Publication Data
US 2015/0138215 A1 May 21, 2015

Related U.S. Application Data

(63) Continuation of application No. 12/895,707, filed on Sep. 30, 2010, now Pat. No. 8,963,797.

(60) Provisional application No. 61/298,522, filed on Jan. 26, 2010, provisional application No. 61/292,830, filed on Jan. 6, 2010.

(51) Int. Cl.
| | |
|---|---|
| *G06F 3/14* | (2006.01) |
| *G06T 1/20* | (2006.01) |
| *G06T 3/40* | (2006.01) |
| *G06T 5/00* | (2006.01) |
| *G06T 11/00* | (2006.01) |
| *G06T 11/60* | (2006.01) |
| *G09G 5/00* | (2006.01) |

(52) U.S. Cl.
CPC ............... *G06T 1/20* (2013.01); *G06F 3/1431* (2013.01); *G06F 3/1438* (2013.01); *G06T 3/40* (2013.01); *G06T 5/009* (2013.01); *G06T 11/001* (2013.01); *G06T 11/60* (2013.01); *G09G 5/006* (2013.01); *G09G 2330/021* (2013.01); *G09G 2340/0407* (2013.01); *G09G 2340/06* (2013.01); *G09G 2340/125* (2013.01); *G09G 2370/04* (2013.01); *G09G 2370/10* (2013.01); *G09G 2370/12* (2013.01)

(58) Field of Classification Search
None
See application file for complete search history.

(56) References Cited

U.S. PATENT DOCUMENTS

| | | |
|---|---|---|
| 5,671,298 A | 9/1997 | Markandey et al. |
| 6,057,854 A | 5/2000 | Davis et al. |

(Continued)

OTHER PUBLICATIONS

"VESA Display Port Standard", Version 1, Revision 1a, Video Electronics Standards Association, Milpitas, CA, Jan. 11, 2008, p. 138.

*Primary Examiner* — Joni Richer
(74) *Attorney, Agent, or Firm* — Blakely, Sokoloff, Taylor & Zafman LLP

(57) ABSTRACT

A display driving architecture that can include two graphics pipelines with an optional connection between them to provide a mirrored mode. In one embodiment, one of the two pipelines can be automatically configured (e.g. routed in one of a plurality of ways, such as routing to do color conversion) based upon the type of cable that is coupled to a connector of the one pipeline. In another embodiment, a connection of a cable can cause display information (e.g. resolutions of an external display) to be provided to an application which can select a display mode while one of the graphics pipelines is kept in a low power state.

19 Claims, 12 Drawing Sheets

(56) References Cited

U.S. PATENT DOCUMENTS

| | | |
|---|---|---|
| 6,310,659 B1 | 10/2001 | Glen |
| 6,343,309 B1 | 1/2002 | Clarke et al. |
| 6,628,243 B1 | 9/2003 | Lyons et al. |
| 6,664,959 B2 | 12/2003 | Duluk, Jr. et al. |
| 7,012,610 B2 | 3/2006 | Turner et al. |
| 7,053,863 B2 | 5/2006 | Glen et al. |
| 7,054,965 B2 | 5/2006 | Bell et al. |
| 7,184,000 B2 | 2/2007 | Itakura |
| 7,295,578 B1 | 11/2007 | Lyle et al. |
| 7,456,836 B2 | 11/2008 | Mamiya et al. |
| 7,477,256 B1 | 1/2009 | Johnson |
| 7,502,947 B2 | 3/2009 | Chen et al. |
| 8,411,753 B2 | 4/2013 | Cha et al. |
| 2008/0143731 A1 | 6/2008 | Cheng et al. |
| 2009/0141033 A1 | 6/2009 | Street |
| 2009/0322723 A1 | 12/2009 | Wu |
| 2011/0157181 A1 | 6/2011 | Diard et al. |

DISPLAY DRIVING ARCHITECTURES

RELATED APPLICATIONS

This application is a continuation of co-pending U.S. application Ser. No. 12/895,707 filed on Sep. 30, 2010, which claims the benefit of U.S. Provisional Application No. 61/298,522 filed on Jan. 26, 2010 and U.S. Provisional Application No. 61/292,830 filed on Jan. 6, 2010, which applications are incorporated herein by reference.

TECHNICAL FIELD

This application relates generally to the field of display driving architectures and more particularly, in certain embodiments, to those display driving architectures which can drive two or more displays concurrently.

BACKGROUND OF THE INVENTION

Electronic devices, such as computer systems, wireless cellular telephones, mobile computing devices, tablet computing devices or other data processing systems often include a built-in internal visual display device. The internal display device is used to display visual content generated by or stored on the electronic device. The internal display device may be, for example, an internal liquid crystal display (LCD) device.

Certain electronic devices may additionally include a connector, such as an (Extended Video Graphics Array (XVGA) connector or other connector known in the art, to connect to an external visual display device. The external display device may be for example a standalone LCD or cathode ray tube (CRT) display. In some instances, the electronic device can be set up such that both the internal display device and the external display device display the same visual content concurrently. This may be referred to as a mirrored mode. Alternatively, certain electronic devices can also be set up so that the two display devices will display different images, such as portions of an extended desktop which allows a user to move a window from one desktop to another desktop by moving the window between the two displays.

SUMMARY OF THE DESCRIPTION

Display driving architectures are described herein. In one embodiment, a display driving architecture can include two display or graphics pipelines with an optional connection between them to provide a mirrored mode. A first graphics or display pipeline can be coupled to an internal display device to drive the internal display device while a second graphics or display pipeline can be coupled to a connector which is configured to drive an external display device. A connection from the first graphics pipeline to the second graphics pipeline can provide a mirrored mode to display an image concurrently on both the internal display device and the external display device. In this mirrored mode, the second graphics pipeline may be powered down to conserve power while the first graphics pipeline generates display data for display on both the internal display device and the external display device.

In another embodiment, one of the two pipelines can be automatically configured based upon the type of cable that is coupled to a connector of one of the pipelines. The automatic configuring can involve routing in one of a plurality of ways, such as routing to do color space conversion or routing to not do color space conversion. The routing can occur within a second display pipeline which drives the connector that in turn drives the external display device.

In another embodiment, a data processing system can employ a power conservation technique to conserve power within the second graphics pipeline. In one implementation of this technique, a connection of a cable can cause display information, such as a resolution of the external display, to be provided to an application which can select a display mode, such as a resolution displayable on the external display device while the second graphics pipeline is kept in a low power state. In a method according to this embodiment, data is generated to be displayed on an internal display of the data processing system through a first display pipeline. When it is determined that a cable has been coupled to the connector which drives the external display, a signal, such as interrupt signal, causes an operating system component to retrieve information about the external display, such as resolution information, and provides that information to a software application which can select a resolution for the external display or can select a color mode for the external display while maintaining the second display pipeline, which will drive the external display, in a low power state. After selecting a resolution or other state for the external display, the software application can begin to generate data to be displayed on the external display, and in one embodiment only after the data is generated and ready to be drawn on the external display device, will the operating system cause the second display pipeline to be powered up from its low power state. In this manner, overall power consumption of the data processing system can be reduced by keeping the second display pipeline in a low power state until the system is ready to drive display content to the external display device.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, or other types of invocations or parameters via the API.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
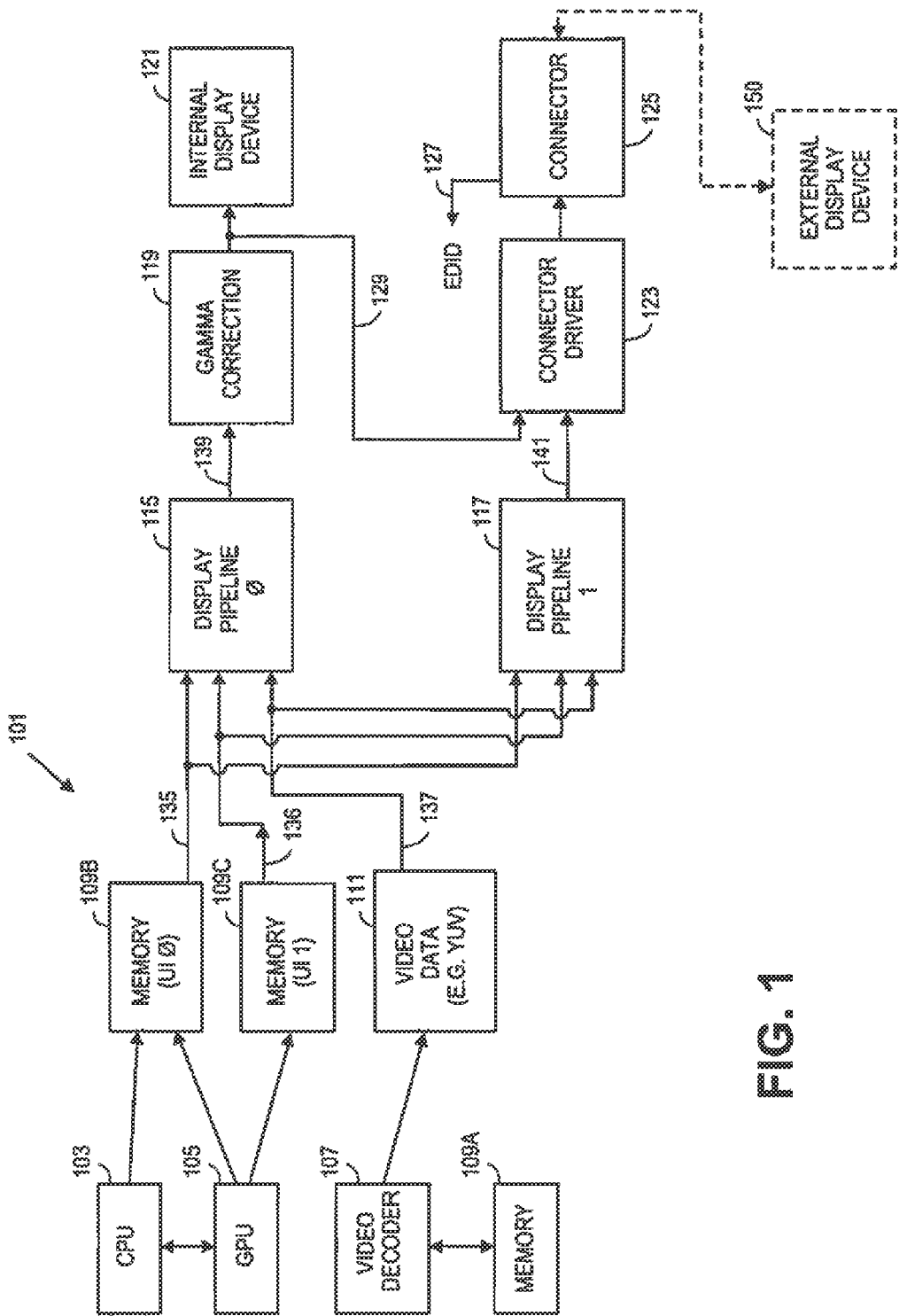
FIG. 1 shows an example of a display driving architecture which includes two display pipelines.

FIG. 1 shows an example of a display driving architecture which includes two display pipelines. A first display pipeline 115 drives an internal display device 121 and a second display pipeline 117 is configured to drive an optional external display device, such as the external display device 150. The data processing system shown in FIG. 1 may be a portable, general purpose computer system or a portable, special purpose computer system or other types of data processing systems, such as cellular telephones, smart phones, personal digital assistants, an embedded electronic device or a consumer electronic device. The data processing system 101 can include a CPU, such as one or more microprocessors. The CPU 103 can be coupled to a graphics processing unit (GPU) 105 through one or more buses as is known in the art.

The data processing system 101 may further include a video decoder 107 which can be a hardware video decoder, or a video decoder implemented with both hardware and software, to decode compressed and optionally encrypted media data. The video decoder 107 may be employed to decode video from a camera or from a storage device which stores the video content, such as for example a movie. The data processing system 101 can include one or more memory devices, such as RAM, flash, etc. which can store the data used to generate displayable content as well as the displayable content itself. Memories 109A, 109B, and 109C can be either separate memories or the same memory, such as a single integrated circuit or multiple integrated circuits implementing a single memory space, etc. as is known in the art. The CPU 103 and the GPU 105 can generate images or other data to be displayed and store those images in memory. As shown in the example of FIG. 1, the GPU 105 can generate images to be displayed and store those images into memory 109B and memory 109C, while the CPU 103 can store images it creates to be displayed into memory 109B. Alternatively, the CPU 103 can write to both memories 109B and 109C while the GPU could write only one or both. The memory 109A can be used to store video data being decoded, such as a compressed or encrypted movie. The output from the video decoder 107 provides video data, which can be temporarily stored, in a memory 109A, the output of which is the output 137 which is used to drive both display pipelines 115 and 117. The output 135 from the memory 109B drives both display pipelines and similarly the output 136 from memory 109C also drives both display pipelines 115 and 117. Further details with respect to an embodiment of the display pipelines 115 and 117 are provided below in conjunction with FIG. 4.

Figure 3:
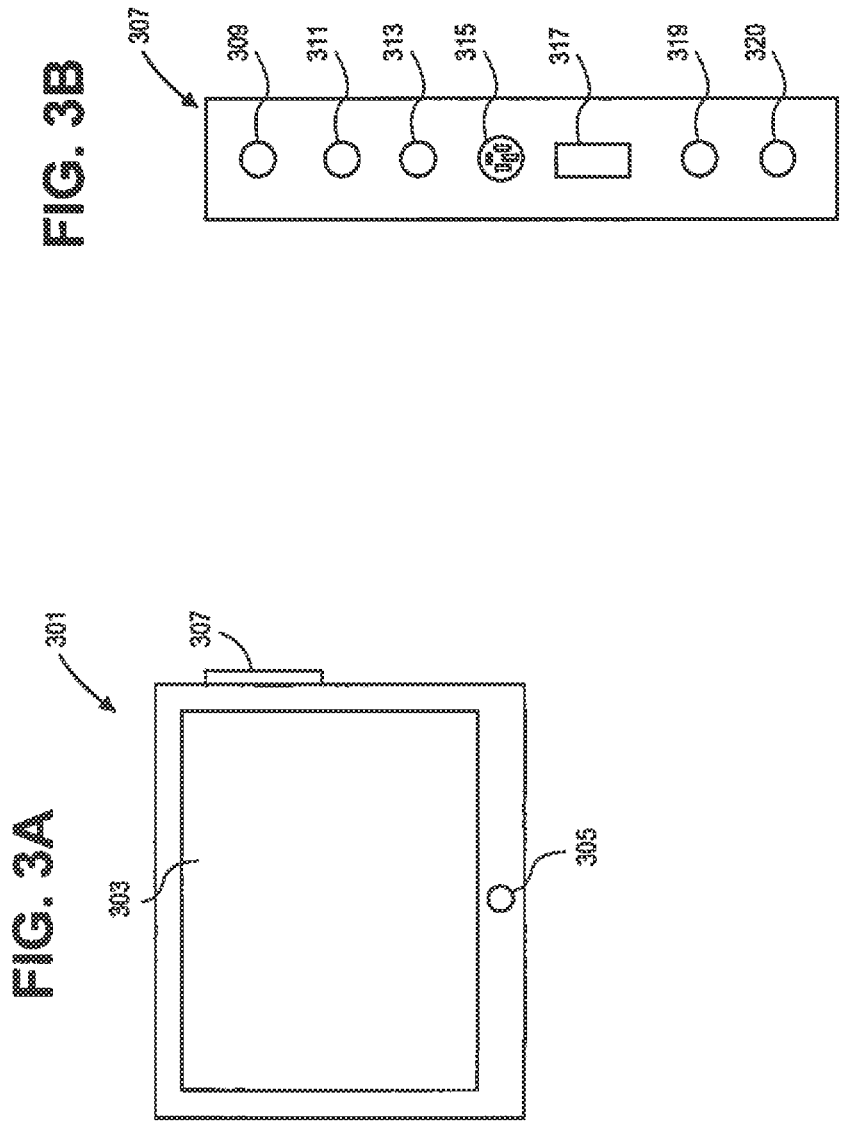
FIG. 3A shows a top view of a data processing system which may use any one of the embodiments or a combination of embodiments described herein.
FIG. 3B is an example of a connector on the device shown in FIG. 3A, the connector being designed to, among other things, provide a connection to an external display.

The output 139 from the display pipeline 115 is coupled to an input of a gamma correction component 119. Further details in connection with this gamma correction component 119 are provided below in conjunction with FIG. 5. The output from the gamma correction component 119 is coupled to the internal display device 121 to drive the internal display device and is also coupled, through connection 129, to the connector driver 123 which also receives the output 141 from the display pipeline 117. Further details in connection with the connector driver 123 are provided below in conjunction with FIG. 6. The connector driver 123 drives the connector 125, an example of which is shown in FIG. 3B. This connector can, in certain embodiments, provide information about the display apparatus which it drives, such as the external display device 150. In one embodiment, the connector 125 can provide information about the resolution or color modes or other features of the external display device which the external display device can support. An example of such information is the information known as EDID (Extended Display Information Data). This data can specify resolutions and color modes that the external display device can support which also indicates resolutions and display modes that the external display device cannot support. The EDID information can be provided to an operating system component as described further below which in turn can pass this information to a user application to allow the user application to select a resolution or a color mode or both as described further below.

The connection 129 from the output of the gamma correction component 119 allows for, in at least certain embodiments, a mirrored mode in which the internal display device and the external display device both display the same image on their displays. It will be appreciated that the display devices themselves may be any one of a variety of type of display devices, such as an LCD display, an LED (Light Emitting Diode) display, an organic LED display, or a CRT, etc. In an alternative embodiment, the data processing system 109 can include an optional scaler and timer generator in the path of the connection 129 to provide for greater flexibility in connecting an external display device. For example, the optional sealer and timer generator in the path of connection 129 can allow external display devices to have resolutions or screen sizes that are different than the resolutions or screen size of the internal display device.

Figure 2:
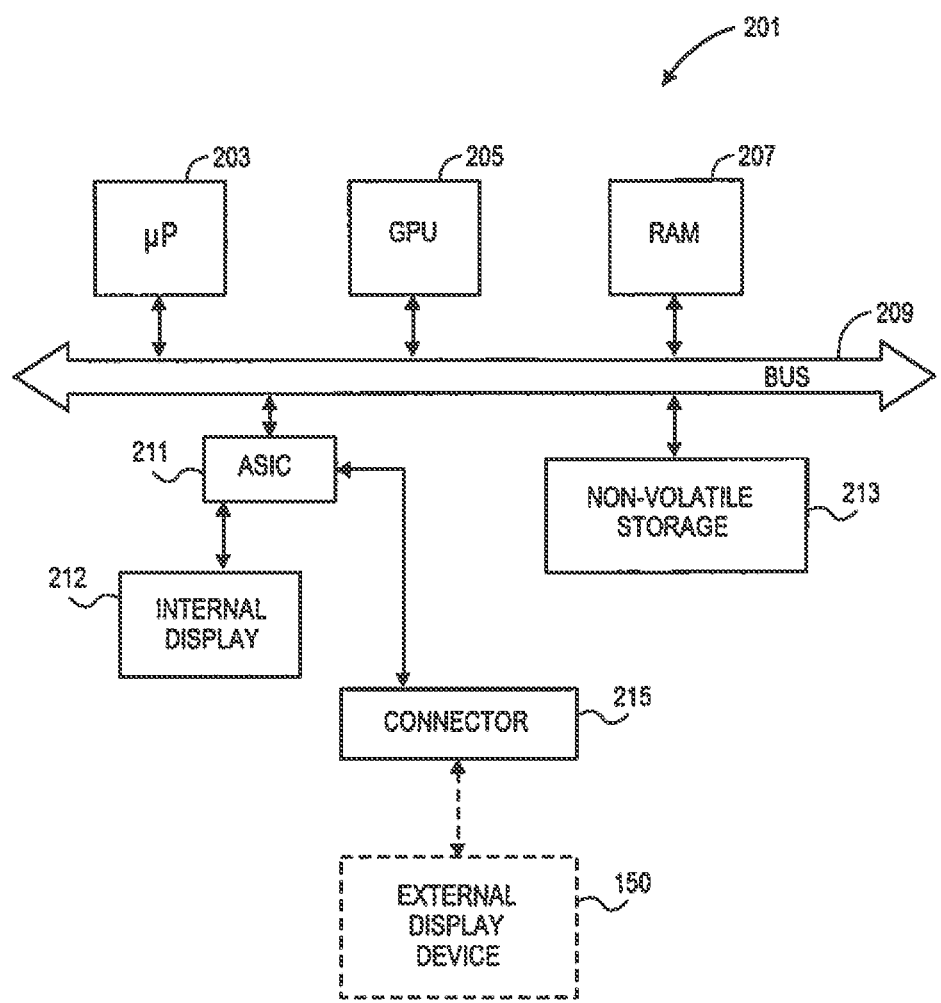
FIG. 2 shows a more general example of a display driving architecture which includes two display or graphics pipelines, one of which drives an internal display device and the other of which drives an external display device.

FIG. 2 shows a more general example of a display driving architecture which can include two or more display pipelines, such as the display pipelines 115 and 117 shown in FIG. 1. The display pipelines may be implemented within the ASIC 211 shown in FIG. 2. An ASIC is an application specific integrated circuit which is configured to provide the functionality of two display pipelines and associated components (e.g. gamma correction and connector drivers). The memories 109A, 109B and 109C may be implemented as RAM 207 which is coupled to the rest of the components shown in FIG. 2 through the bus 209. A non-volatile storage 213 may store software, such as operating system components described herein as well as user applications, such as a web browser, an email application, a word processing application, a document viewing application, and other user applications known in the art. The CPU 103 may be the microprocessor 203 and the GPU 105 of FIG. 1 may be the GPU 205 shown in FIG. 2. The internal display 212 shown in FIG. 2 may be the same as the internal display 121 shown in FIG. 1 and the connector 215 may be the same as the connector 125 shown in FIG. 1. It will be appreciated that in alternative embodiments the ASIC may implement the microprocessor 203 and the GPU 205, and the memory 207 and the non-volatile storage 213 may be replaced with flash memory which is coupled to the ASIC 211 through a bus 209.

FIG. 3A shows an example of a data processing system which may employ one or more of the embodiments described herein. In one implementation, the data processing system 301 may be a general purpose or special purpose computer that has the formfactor of a tablet as shown in FIG. 3A. A large portion of one surface of the device is the internal display 303 which can include a multi-touch sensitive touch screen input device integrally mounted and aligned with the internal display 303. The data processing system 301 may include one or more buttons or switches to allow the user to interact with the device, such as the button 305. The data processing system 301 can also include a connector 307 which allows for, among other things, the connection of an external display device. It will be appreciated that the data processing system 301 may include other connectors, such as a connector for a charger or power supply, and connectors for synchronization, such as a USB connector for a USB cable, etc. The data processing system 301 may also include wireless transceivers, such as a wireless transceiver for WiFi or a wireless transceiver for a cellular telephone or other communications.

FIG. 3B shows an example of the connector 307. In one embodiment, the connector 307 includes 5 RCA-type jacks, such as the jacks 309, 311, 313, 319, and 320. The connector further includes an S-video connector jack 315 and an HDMI jack 317. The jack 309 may provide a composite video connection when the data processing system 301 is connected to a composite video monitor connection, and when the device is connected through a component video connection, the jack 309 provides one of the three component video signals while the jacks 311 and 313 provide the other two component video signals. Jacks 319 and 320 can provide, in one embodiment, left and right audio stereo signals. The connector 307 is one implementation of the connector 125 or the connector 215 shown in FIGS. 1 and 2 respectively.

Figure 4:
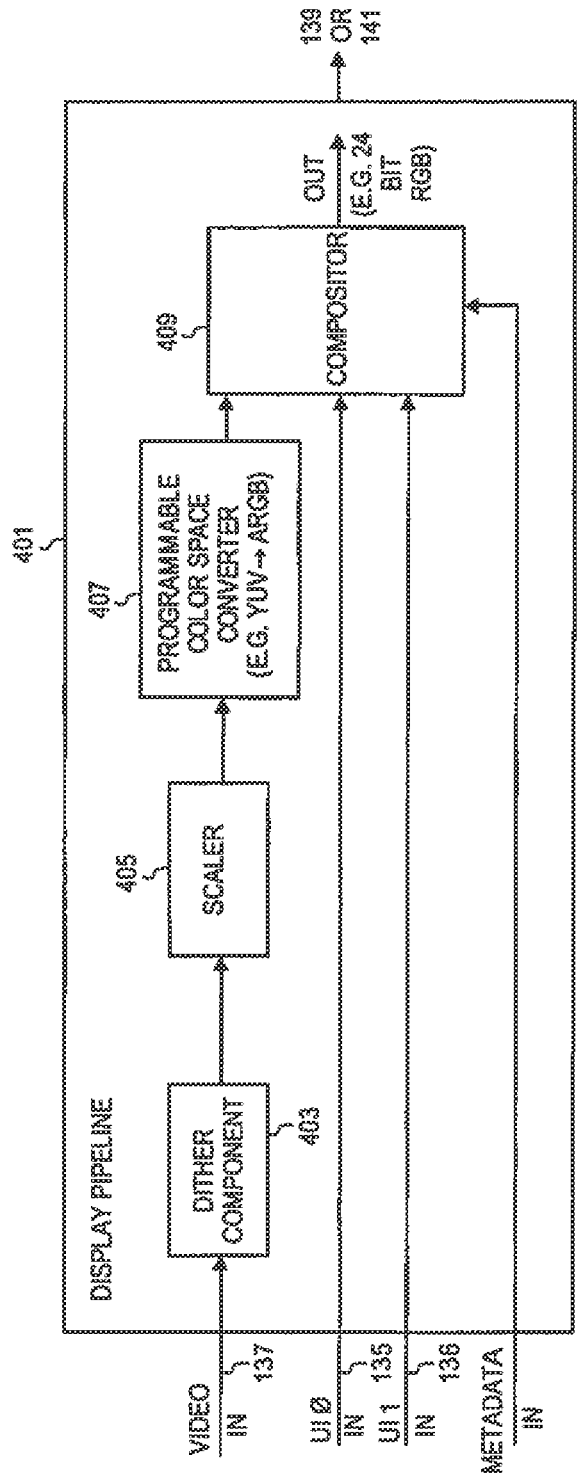
FIG. 4 shows an example of a display pipeline according to one embodiment of the present invention.

FIG. 4 shows, in more detail, an implementation of the display pipeline, such as the display pipeline 115 or the display pipeline 117. The display pipeline 401 shown in FIG. 4 includes a dither component 403, a scaler 405, a programmable color space converter 407, and a compositor 409. The dither component 403 receives the video signal from the output 137 of the video data 111 shown in FIG. 1. The compositor 409 receives an output from the converter 407 and the outputs 135 and 137 from the memories 109B and 109C respectively shown in FIG. 1. In addition, the compositor 409 receives metadata used to composite, using techniques known in the art, the images in memories 109B and 109C with the decoded video content from video data 111 using the metadata. The metadata specifies the position of source rectangles and position of video data and the position of the images in memories 109B and 109C in order to provide a composited image. For example, a movie may be displayed within a window having a position and size specified by the metadata and this window may be displayed over other images such as a desktop or images of a user interface, such as images provided by the outputs 135 and 136. In one embodiment, the output from the compositor may be a 24-bit RGB output. The dither component 403 receives the video output 137 and performs a conventional dither operation as is known in the art. The scaler 405 receives the output from the dither component and performs a conventional scaling operation on the video image and provides the output which is scaled to the color space converter 407 which may be programmable in one embodiment. The converter may convert from the color space YUV to the color space RGB which may be modified to include an alpha value for transparency as is known in the art, thereby providing a color space as ARGB. Other color space conversions may also be employed as is known in the art to convert from a video display color space to another color space.

Figure 5:
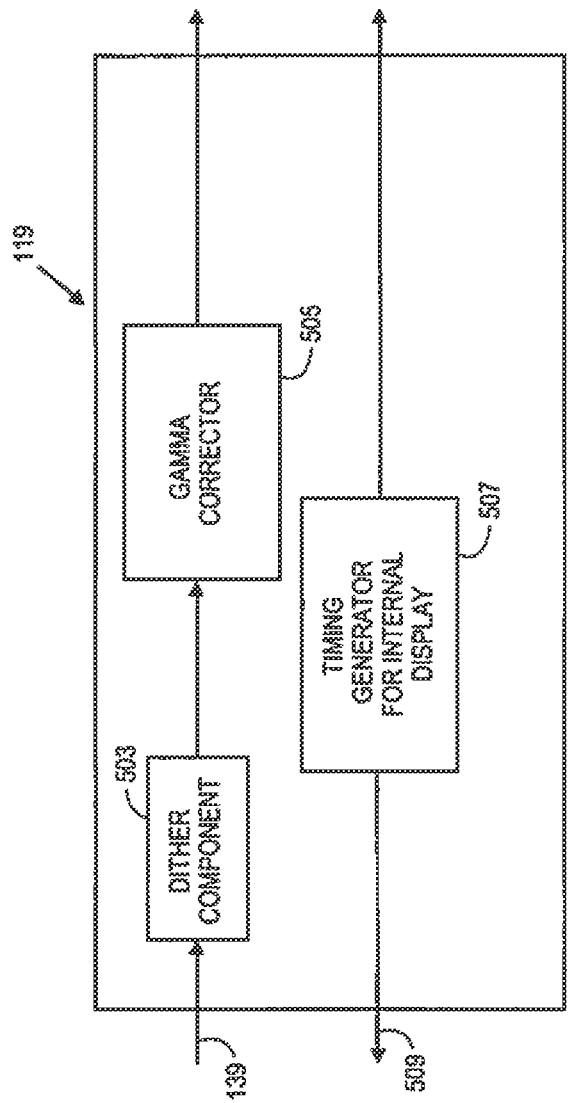
FIG. 5 shows an example of one component of a display pipeline according to one embodiment of the present invention.

FIG. 5 shows an example of a gamma correction component, such as the gamma correction component 119 shown in FIG. 1. The gamma correction component can include a dither component 503 and a gamma corrector 505, each of which can employ standard methods to provide dithering and gamma correction respectively. The input to the dither component 503 is coupled to receive the output from the display pipeline 115, and the output of the dither component 503 drives the input of the gamma corrector 505, which in turn drives an input to the internal display device 121. The output of the gamma correction process from the gamma corrector 505 can also be used to drive the connection 129 to provide a mirrored mode as described herein. A timing generator 507 generates timing signals to drive the internal display device 121 as is known in the art and also provides an output 509 which includes timing signals used to obtain display data in memory to provide inputs for the display pipeline.

Figure 6:
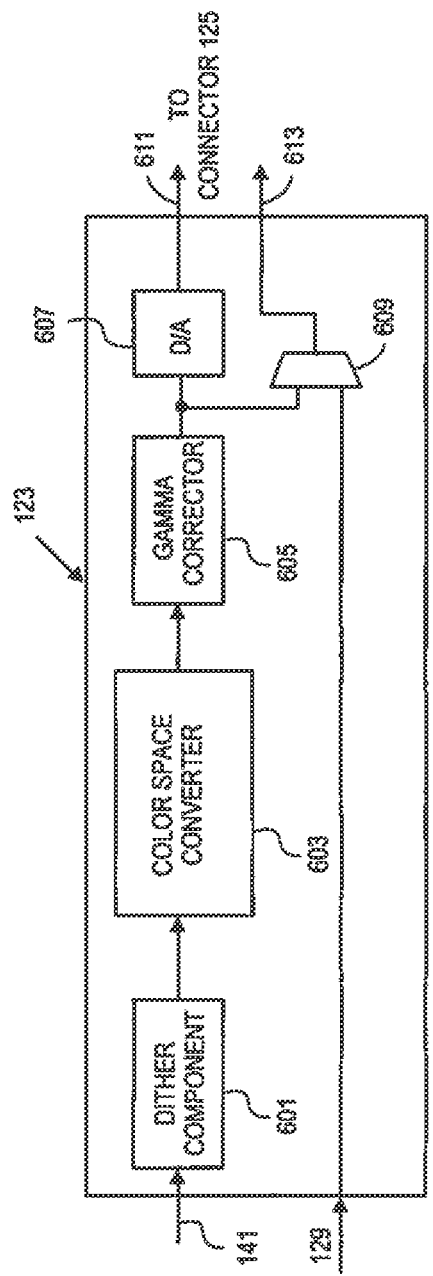
FIG. 6 shows an example of a component of a display pipeline according to an embodiment of the present invention.

FIG. 6 shows an example of a connector driver 123 which is coupled to the output 141 from the display pipeline 117. The output 141 drives the dither component 601 which in turn drives the color space converter 603, which in turn drives the gamma corrector 605. The dither component 601 may perform a conventional dithering operation, and the color space converter 603 may provide a conventional color space conversion; however, the color space converter 603 can be configured to be selectively re-routed depending upon the type of cable that is coupled to the connector 125. For example, if the connector is connected to an analog TV out, then the color space converter will convert from RGB to YUV or another TV-compatible color space. On the other hand, if the type of cable connected to the connector 125 specifies that the display device is a digital output device, then the color space conversion may or may not convert from RGB based on the type of digital monitor or display device and the type of application which is providing the display data. In this manner, the color space converter 603 can be modified to provide different color space conversions depending upon the type of cable which is connected to the connector 125 as is explained further below. In other words, routing of the video signals is modified based upon the type of cable connected, and this modification, in one embodiment, determines how the color space converter 603 works. The output from the gamma corrector 605 drives a digital-to-analog converter 607 which in turn drives pins or jacks on the connector 125. The connection 129 for mirrored mode is coupled to a multiplexer 609 or other switch which switches the output 613 from either mirrored mode (in which case the connection 129 drives the signal to the connector 125) or non-mirrored mode in which case the output from the gamma corrector 605 drives the digital output on the output 613. The output 613 can be coupled to an HDMI output, and the output 611 can be coupled to analog outputs, such as RCA plugs for driving composite or component video cables or an S-video cable.

Figure 7:
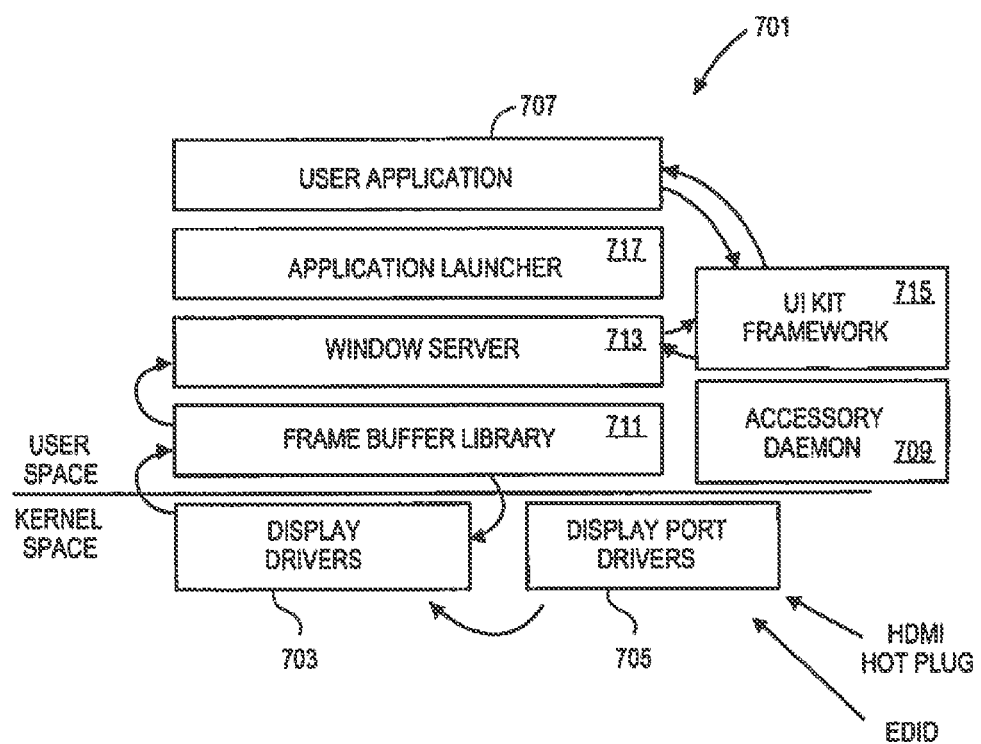
FIG. 7 shows an example of a software stack for implementing at least one embodiment of the present invention.

FIG. 7 shows an example of a software stack which may be implemented on the data processing system 101 shown in FIG. 1 or the data processing system shown in FIG. 2. The various software components in this software stack may be stored in a memory such as the RAM 207 or the non-volatile storage 213 or a combination of those memories during execution of the software components. When the components are not being executed they may be stored in a non-volatile storage such as a hard drive or a flash memory, etc. The software components may be segregated into two groups as shown in FIG. 7; in particular into a user space and a kernel space. In the kernel space, display port drivers 705 can be configured to communicate with a connector, such as the connector 125, to receive signals indicating that an HDMI cable has been plugged in and to receive display information, such as EDID. The display port drivers 705 can be configured to communicate through software calls with display drivers 703 which can be configured to communicate with other software components such as the frame buffer library 711 or other components. Display driver 703 can perform conventional operations with respect to the control of a display as is known in the art in addition to aspects relating to the embodiments described herein. The software components in the software stack 701 may employ a traditional call and return process in which a calling application calls to another software process and waits for a return of a value which is the response to the call. Moreover, the software components can employ an API, described herein, to perform these calls. The arrows shown in FIG. 7 can represent those calls and returns between the various software components. In alternative embodiments, fewer calls and fewer returns or more calls and more returns to the same or different software components can be implemented for a particular embodiment.

The frame buffer library 711 in the software stack of FIG. 7 may implement software routines for managing frame buffers, such as frame buffers to drive the one or more displays of the data processing system. The window server software component 713 may implement known software processes to manage windows for applications. The application launcher 717 may be a software process that allows a user to launch one or more applications or just one application at a time depending upon the implementation. In one embodiment, the application launcher may be the software program known as Springboard which is an application launcher provided by Apple Inc. on the iPhone. The user application 707 may be any one of a plurality of user applications, such as a web browser, a document viewer, a picture viewer, a movie player, a word processing or text editing application, an email application, or other applications known in the art. The user application can make use of a software framework or one or more software libraries for creating and drawing user interface objects, such as buttons, windows, and other user interface elements and components as are known in the art. This framework can be the user interface (UI) framework 715. In the example shown in FIG. 7, software messages are passed between the framework 715 and the user application 707 in order to communicate information about resolution and color modes of an external display device to the user application and in order to receive a selection from the user application of a resolution and color mode for the external display device. An accessory daemon 709 may be employed to monitor the connection of an external display device and to provide other functions in connection with the methods shown in FIGS. 8, 9, and 10 which are described further below. In one embodiment, as will be described further below, information about the external display device is passed from the hardware and up through the software stack to the user application. In one embodiment, this display information may be filtered EDID display information which is used by the user application (or the operating system) to select a resolution and color mode which are available for use on the external display device. The selection is then passed back down through the software stack to operating system components which then can configure one or more display pipelines as described herein to operate with the external display device. In addition, in those embodiments which employ power conservation for the second display pipeline, the operating system can maintain the second display pipeline in a low power state while the software messages are passed up and down the software stack and the display pipeline is prepared to be configured, and then the operating system components can cause the second display pipeline to be powered up when the user application begins drawing content for display on the external display device. At that point, the operating system components can both power up the second display pipeline and configure it (e.g. select video routing, color space conversion, etc.) based upon selections made by the user application or the operating system.

Figure 8:
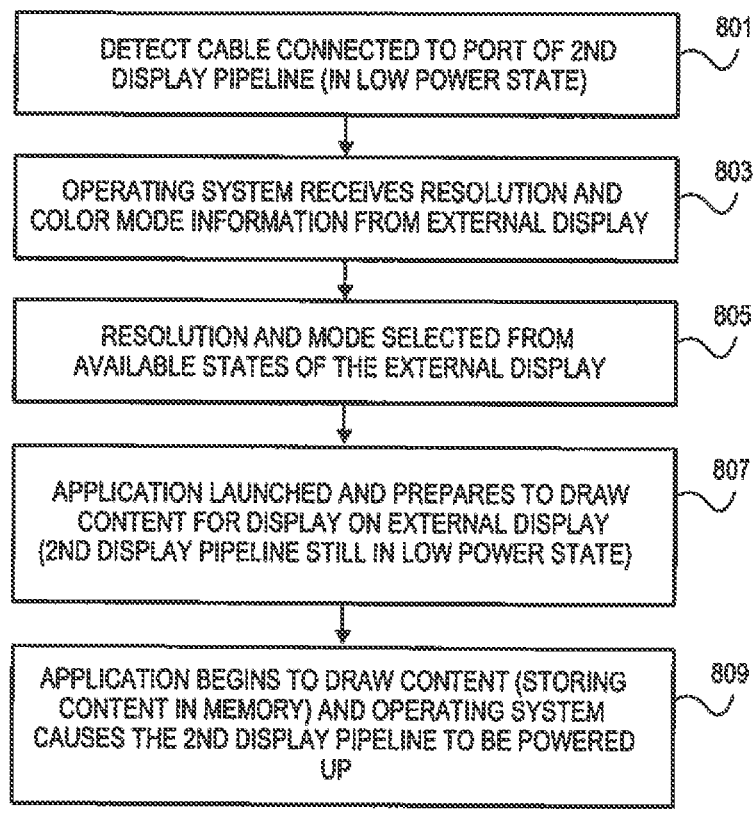
FIG. 8 is a flowchart which depicts a method for conserving power by maintaining a second display pipeline in a low power state until a user application begins to draw content for display on an external display device driven by the second display pipeline.

FIG. 8 shows a general example of how power can be conserved in a second display pipeline even though a functioning external display or monitor has been connected to a connector, such as the connector 125, and even though an application has been launched which can create and draw display data for display on the external display device. The method can begin in operation 801 in which the system detects a cable being coupled to a port of the second display pipeline (e.g. display pipeline 117) which is maintained in a low power state. For example, an HDMI connector can be connected to the connector 125 and the system can detect this while the second display pipeline is maintained in a low power state. The connector 125 can have power to receive and drive EDID signals while the second display pipeline is in a low power state. The operating system, in operation 803, can receive resolution information and color mode information from the external display device. In one embodiment, an example of this information is the EDID information shown in FIG. 1 and this information can be optionally filtered as described herein. In operation 805, a resolution and a mode which is available on the second display are selected. This selection may be performed by the user application or by the operating system. In the embodiment shown in FIG. 9, the user application selects the resolution as will be described further below.

In operation 807, an application, such as a user application, is launched and prepares to draw content for display on the external display device. At this point, the application has not yet drawn the content for display and hence the second display pipeline (e.g. display pipeline 117) can still be maintained in a low power state. Operation 807 can represent the initialization operations which occur when an application is launched but before it is ready to draw content for display on the external display device. When the application begins to draw the content, as shown in operation 809, then the operating system can cause the second display pipeline to be powered up. This embodiment allows an application (which will eventually generate display data for display) to be launched and let the application remain idle for a period of time (e.g. 30 seconds or more) and in that time, the second display pipeline can remain in a low power state and not be powered up until the application actually begins to draw content for display on the external display device. This can occur when the user application is a movie playing application and the user has launched the application but has not yet selected, through a user interface, a play command.

Figure 9:
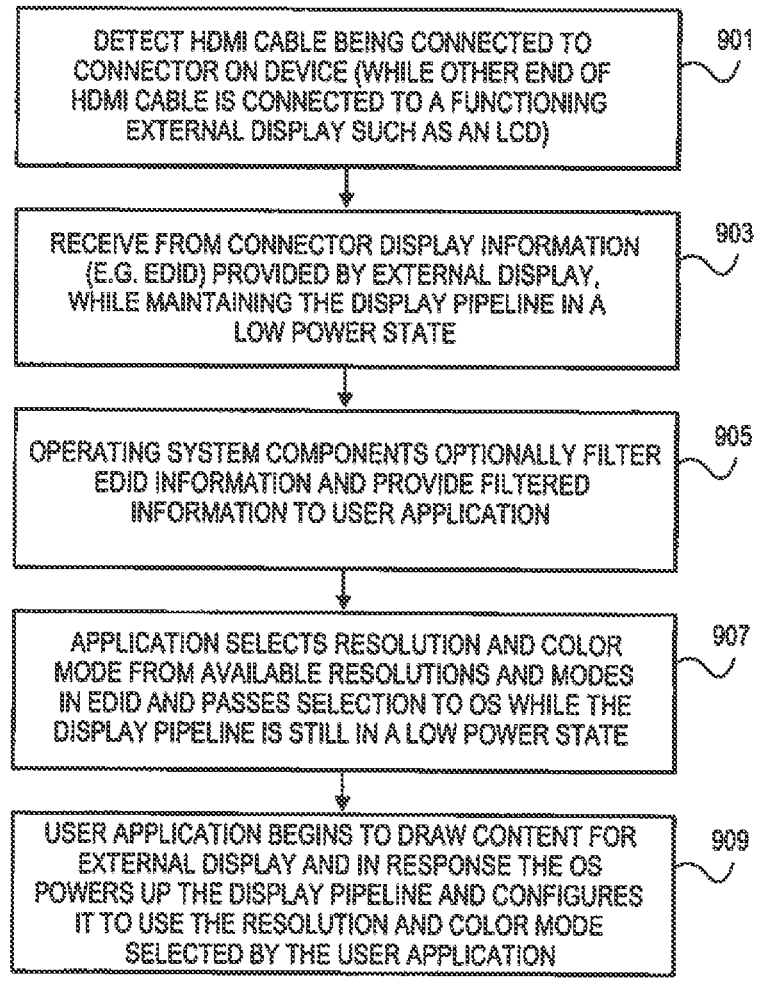
FIG. 9 shows an example of a further embodiment for power conservation.

FIG. 9 shows a more specific example of the method shown in FIG. 8. In the method of FIG. 9, the operating system filters the EDID information in operation 905 and provides the filtered information to the user application. This can be done after detecting a cable being connected to the connector, such as connector 125, in operation 901 and receiving the EDID information from the connector in operation 903. The filtering can be done in order to restrict the available choices to those resolutions and color modes which are supported by the data processing system, such as the data processing system 101, and this filtering can also be done in order to restrict the available choices to those resolutions and color modes that can be properly transmitted over a cable or other link to the external display device. In this way, a user application or other software component cannot select a resolution or color mode which is not available on the data processing system or which is not supported by the cable or other link. In operation 907, the application can select a resolution and color mode from the available resolutions and modes and passes that selection to the operating system component while the display pipeline (e.g. display pipeline 117) is still in a low power state. The passing of information between the software components can be performed using the software stack shown in FIG. 7. In operation 909, the user application can begin to draw content for display on the external display device and in response the operating system software component or components causes the powering up of the second display pipeline and the configuring of that pipeline to use the resolution and color mode selected by the user application. In one particular implementation, when the user application quits, the second display pipeline can be powered down again in order to further conserve power.

The low power states in either embodiment of FIG. 8 or 9 can include keeping the connector (e.g. connector 125 or connector 215 or connector 307) itself in a low power state (e.g. by turning off transmitters or drivers within the connector) and also can include keeping the connector driver 123 in a low power state. Further, in one embodiment, a display port driver (e.g. display port drivers 705) can be configured to turn off power to the transmitters or drivers within the connector if, for example, no data is being transported by the connector within a set period of time.

In one embodiment, the connector (e.g. any one of connectors 125, 215 or 307) can be a connector that complies with the VESA (Video Electronics Standards Association) DisplayPort Standard Version 1, Revision 1a, Jan. 11, 2008 and the display port drivers (e.g. display port drivers 705) can also comply with such a standard. In this embodiment, the filtering described herein can make use of the actual link established during training under that standard (see section 2.5.3.3 of the Jan. 11, 2008 standard) so that the available resolutions and colors can be limited to those that can adequately use the actual link and those that would exceed the bandwidth of the actual link would be filtered out. The training, as is known in the art, allows the connector and the external display device to test the cable (by transmitting known patterns to the external display which then determines whether they have been correctly received and if not correctly received, the transmitter tries a low data rate and fewer lanes), and the results of this testing can be used to further filter out states (e.g. resolutions and color modes) that may exist in an EDID from an external display device. In this way, the noise surrounding the cable, the length of the cable, and the quality of the cable can be analyzed in the training process and then states in the EDID set of states that do not work (because of noise, cable quality, etc.) can be filtered out of the supported display modes. Moreover, this training can also cause filtering out of modes due to limitations of the transmitter.

Figure 10:
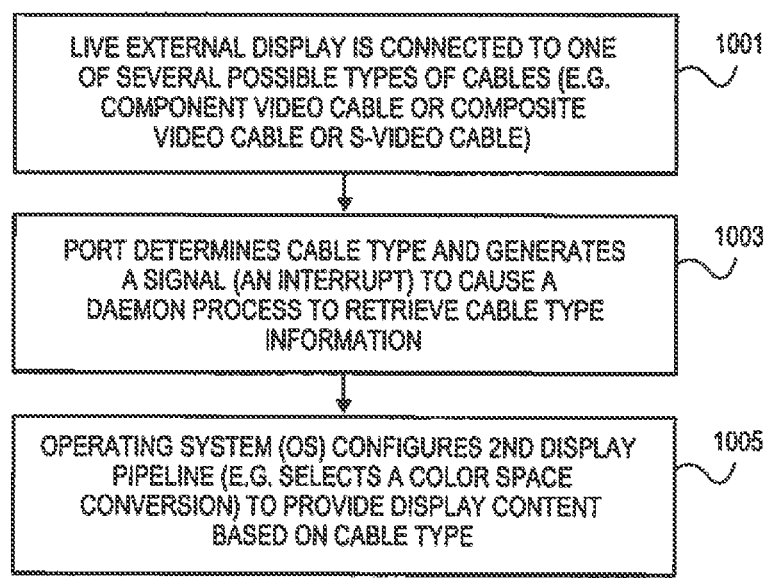
FIG. 10 is a flow chart which depicts a method in which routing of signals within a display pipeline is performed automatically in response to determining the type of cable connected to a connector which is configured to drive an external display device.

FIG. 10 is an example of a method of one embodiment in which the data processing system, such as the data processing system 101, can configure a display pipeline based upon the type of cable connected to a connector on the data processing system, such as the connector 125. In one embodiment, when a live, external display device is connected to a connector of the data processing system in operation 1001, the connector or port can determine the type of cable type as shown in operation 1003. The external display device can be considered live when it has been powered on and one end of the cable has been plugged into the input of the display device and the other end has been connected to the connector 125. The connector 125 can determine the type of cable in one embodiment which is connected to it and can generate a signal to cause a daemon process or other mechanism to retrieve the cable type information. In one implementation, the accessory daemon 709 in conjunction with the display port driver 705 can obtain information about the cable type. In one embodiment, the cable type can vary between a component video cable set, a composite video cable, an S-video cable, or other cable type. In response to determining the type of cable which has been connected to the connector, such as the connector 125, the operating system, in operation 1005, configures the second display pipeline to provide display content based upon the cable type. This configuration may include routing signals one way or another way to perform one or more different types of color space conversion or not perform color space conversion. In one embodiment, the color space converter 603 may be configured in a manner which is dependent upon the type of cable as determined in operation 1003 and as configured in 1005 of FIG. 10.

The data processing system 101 or the data processing system 201 may be a portable tablet device which includes a touch screen which is integrally mounted with and registered with the internal display device. Other modifications of the described embodiments may include one or more wireless transceivers coupled through input/output controllers to the rest of the system, such as the system shown in FIG. 2. These wireless transceivers may be used to communicate with one or more other devices or networks, such as a wireless cell phone network or a WiFi network or other wireless networks.

One or more Application Programming Interfaces (APIs) may be used in some embodiments. An API is an interface implemented by a program code component (hereinafter "API implementing component") that allows a different program code component (hereinafter "API calling component") to access and use one or more functions, methods, procedures, data structures, classes, and/or other services provided by the API implementing component. An API can define one or more parameters that are passed between the API calling component and the API implementing component.

An API allows a developer of an API calling component (which may be a third party developer) to leverage specified features provided by an API implementing component. There may be one API calling component or there may be more than one such component. An API can be a source code interface that a computer system or program library provides in order to support requests for services from an application. An API can be specified in terms of a programming language that can be interpreted or compiled when an application is built.

In some embodiments the API implementing component may provide more than one API each providing a different view of or with different aspects that access different aspects of the functionality implemented by the API implementing component. In other embodiments the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. Thus, the API calling component may declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may be an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system as the API implementing component) that communicates with the API implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API may allow multiple API calling components written in different programming languages to communicate with the API implementing component (thus the API may include features for translating calls and returns between the API implementing component and the API calling component); however the API may be implemented in terms of a specific programming language.

Figure 11:
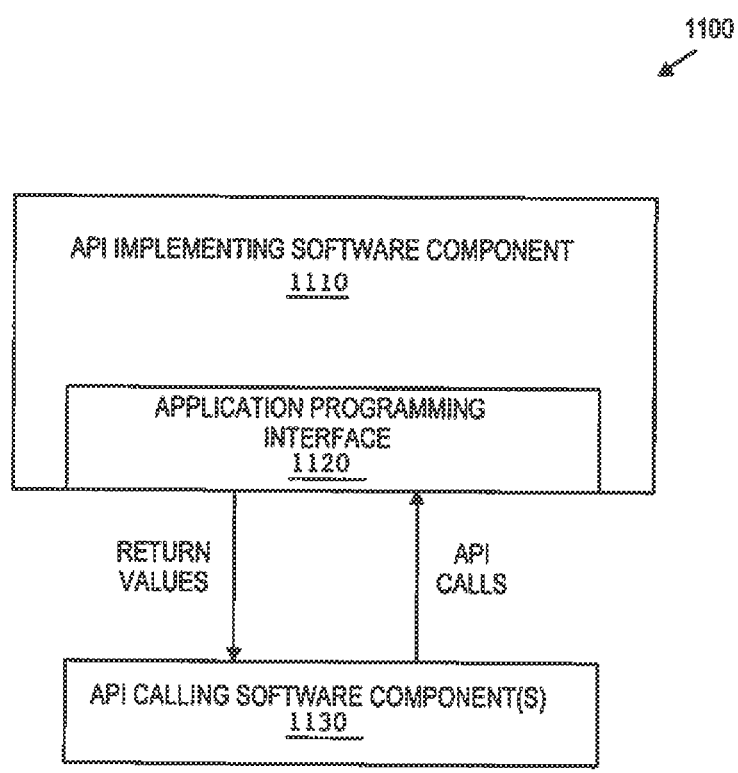
FIG. 11 is a block diagram showing an exemplary API architecture.

FIG. 11 is a block diagram illustrating an exemplary API architecture, which may be used in some embodiments of the invention. As shown in FIG. 11, the API architecture 1100 includes the API implementing component 1110 (e.g., an operating system, a library, a device driver, an API, an application program, or other module) that implements the API 1120. The API 1120 specifies one or more functions, methods, classes, objects, protocols, data structures, formats and/or other features of the API implementing component that may be used by the API calling component 1130. The API 1120 can specify at least one calling convention that specifies how a function in the API implementing component receives parameters from the API calling component and how the function returns a result to the API calling component. The API calling component 1130 (e.g., an operating system, a library, a device driver, an API, an application program, or other module), makes API calls through the API 1120 to access and use the features of the API implementing component 1110 that are specified by the API 1120. The API implementing component 1110 may return a value through the API 1120 to the API calling component 1130 in response to an API call.

It will be appreciated that the API implementing component 1110 may include additional functions, methods, classes, data structures, and/or other features that are not specified through the API 1120 and are not available to the API calling component 1130. It should be understood that the API calling component 1130 may be on the same system as the API implementing component 1110 or may be located remotely and accesses the API implementing component 1110 using the API 1120 over a network. While FIG. 11 illustrates a single API calling component 1130 interacting with the API 1120, it should be understood that other API calling components, which may be written in different languages (or the same language) than the API calling component 1130, may use the API 1120.

The API implementing component 1110, the API 1120, and the API calling component 1130 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 12:
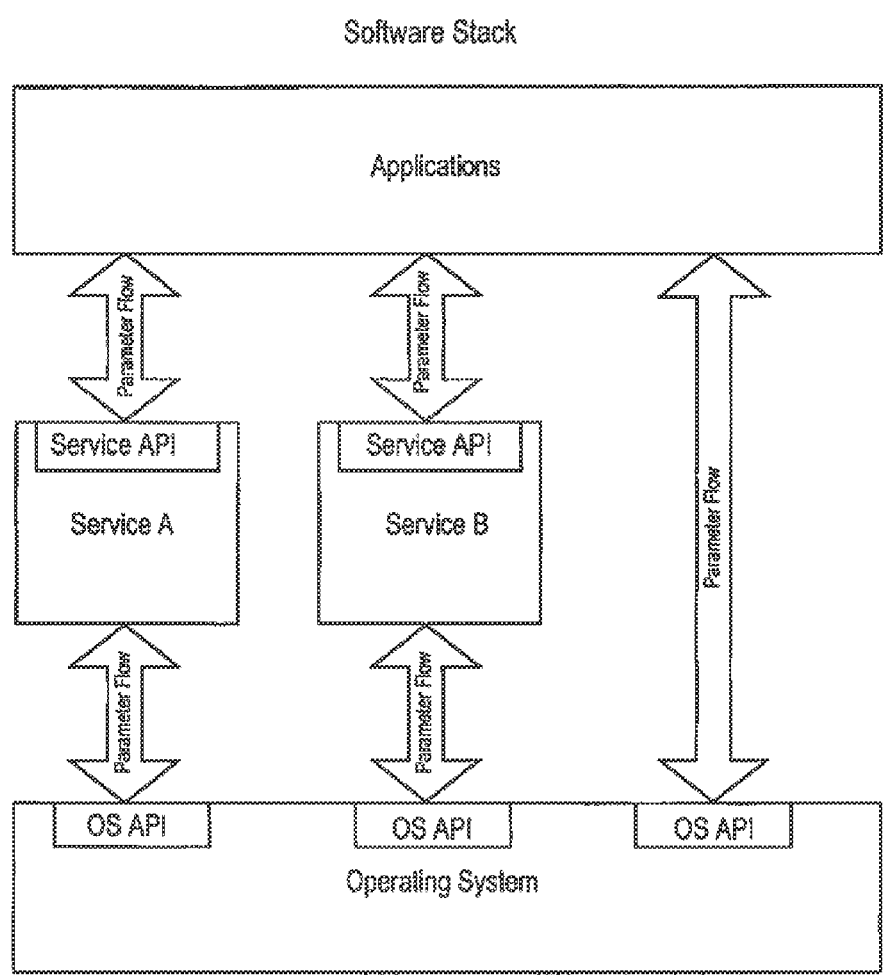
FIG. 12 shows an example of a software stack using one or more APIs.

In FIG. 12 ("Software Stack"), an exemplary embodiment, applications can make calls to Services A or B using Service API and to Operating System (OS) using OS API. Services A and B can make calls to OS using OS API.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system comprising:
a graphics processor coupled to memory;
a first display pipeline configured to be coupled to a first display device at a first end of the first display pipeline and coupled to the memory at a second end of the first display pipeline;
a second display pipeline being configured to drive a second display device, and coupled to the memory at an end of the second display pipeline; and
a connection between the first display pipeline and the second display pipeline to bypass the second display pipeline, the connection to provide a mirrored mode to display an image on the first display device and on the second display device through the first display pipeline.

2. The data processing system as in claim 1, wherein the first display pipeline comprises a first compositing apparatus to composite decoded video content with other display content, and wherein the second display pipeline comprises a second compositing apparatus to composite decoded video content with other display content, and wherein the first display pipeline and the second display pipeline are configured to provide different display data to the first display device and the second display device respectively when the data processing system is in a non-mirrored mode.

3. The data processing system as in claim 2, wherein the first display pipeline further comprises a first dither component to perform a dither operation on the decoded video content, a first scaler to perform a scaling operation on the decoded video content, and a first programmable color space converter to convert the decoded video content from a first color space to a second color space, and wherein the second display pipeline comprises a second dither component, a second scaler and a second programmable color space converter.

4. The data processing system as in claim 2, wherein the connection comprises a switch configured to be switched between the mirrored mode and the non-mirrored mode and wherein when the data processing system is in the non-mirrored mode, the first compositing apparatus and the second compositing apparatus are configured to composite video concurrently, and wherein the data processing system is an embedded device having a wireless transceiver and a touch screen input device integrally coupled to the first display device.

5. The data processing system as in claim 1, further comprising:
a gamma correction component coupled between the first display pipeline and the first display device, the gamma correction component to perform a gamma correction operation on output of the first display pipeline.

6. The data processing system as in claim 1 wherein the data processing system includes a wireless transceiver and a touch screen input device that is integrally coupled to the first display device.

7. A machine implemented method comprising:
displaying, from memory, a first image on first display device of a data processing system through a first display pipeline;
when the data processing system is in a non-mirrored mode, displaying a second image on a second display device through a second display pipeline; and when the data processing system is in a mirrored mode, displaying, from the memory, the first image on the first display device and concurrently on the second display device through a connection between the first display pipeline and the second display pipeline, while bypassing the second display pipeline.

8. The machine implemented method as in claim 7, wherein displaying the first image on the first display device through the first display pipeline comprises compositing, by the first display pipeline, decoded video content with other display content and wherein displaying the second image on the second display device through the second display pipeline comprises compositing, by the second display pipeline, decoded video content with other display content.

9. The machine implemented method as in claim 8, further comprising:
switching between the mirrored mode and the non-mirrored mode, wherein when the data processing system is in the non-mirrored mode, the first display pipeline and the second display pipeline are configured to composite content concurrently.

10. A non-transitory machine-readable medium storing instructions which, when executed by one or more processors, cause the one or more processors to perform operations comprising the machine implemented method as in claim 9.

11. A non-transitory machine-readable medium storing instructions which, when executed by one or more processors, cause the one or more processors to perform operations comprising the machine implemented method as in claim 7.

12. An electronic device having a mirrored mode and a non-mirrored mode, the electronic device comprising:
a first display device coupled to a first display pipeline;
a second display device coupled to a second display pipeline;
a connection between the first display pipeline and the second display pipeline to bypass the second display pipeline;
one or more processors coupled to memory, the one or more processors to display, from the memory, a first image on the first display device through the first display pipeline and display a second image on the second display device through the second display pipeline when the electronic device is in the non-mirrored mode; and
wherein the one or more processors are further to display, from the memory, the first image on the first display device and concurrently on the second display device through the connection between the first display pipeline and the second display pipeline.

13. The device as in claim 12, wherein the first display device is an internal display device.

14. The device as in claim 12, wherein the second display device is an external display device.

15. The device as in claim 12, further comprising a gamma correction component coupled between the first display pipeline and the first display device, the gamma correction component to perform a gamma correction operation on output of the first display pipeline.

16. The device as in claim 12, wherein the electronic device is an embedded device having a wireless transceiver and a touch screen input device integrally coupled to the first display device.

17. The device as in claim 12, wherein the one or more processors are to composite, by a first compositing apparatus of the first display pipeline, decoded video content with other display content to display the first image on the first display device.

18. The device as in claim 17, wherein the one or more processors are to composite, by a second compositing apparatus of the second display pipeline, decoded video content with other display content to display the second image on the second display device.

19. The device as in claim 18, wherein the connection between the first display pipeline and the second display pipeline is configured to be switched between the mirrored mode and the non-mirrored mode, the first compositing apparatus and the second compositing apparatus configured to composite video concurrently while the connection is switched to the non-mirrored mode.

* * * * *